J. C. PHELAN & H. B. MacALPINE.
MOISTENING ATTACHMENT FOR TYPE WRITER RIBBONS.
APPLICATION FILED OCT. 22, 1917.
1,276,263.
Patented Aug. 20, 1918.
2 SHEETS—SHEET 2.
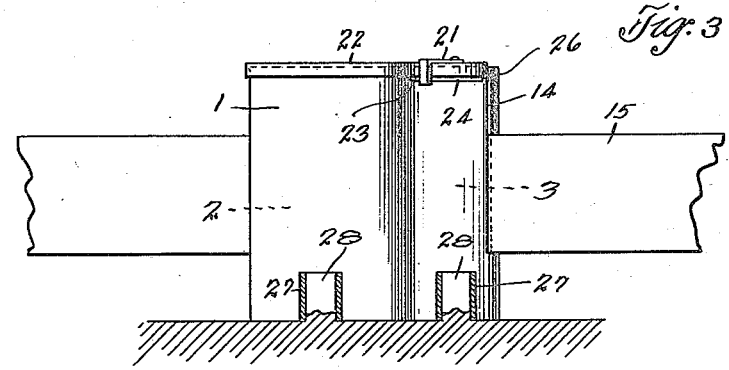
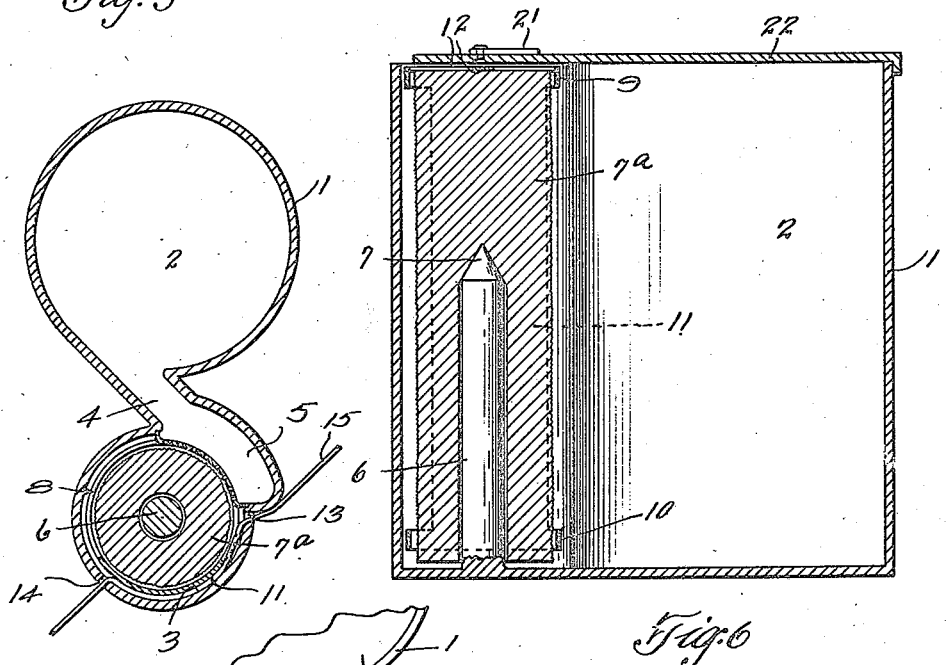
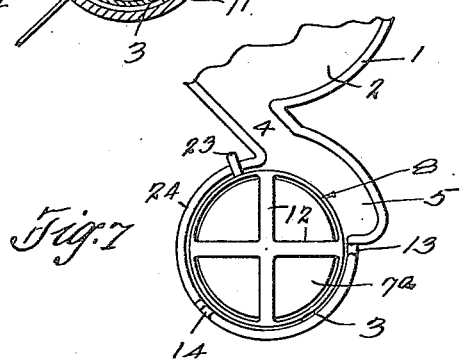
INVENTORS
J. C. PHELAN
& H. B. MacALPINE
By John A. Bernhardt
ATTYS.

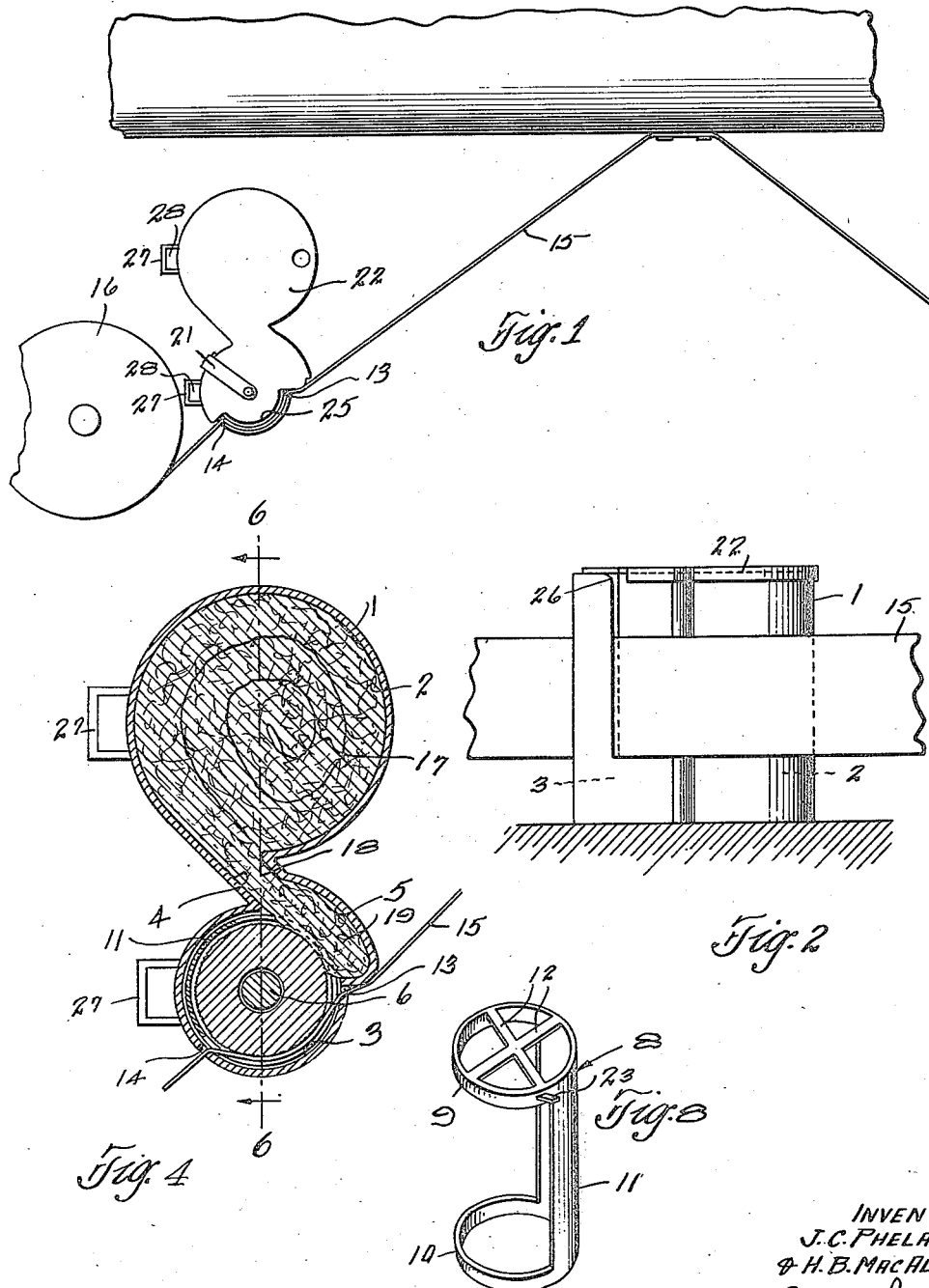

UNITED STATES PATENT OFFICE.

JOHN C. PHELAN, OF EAST CLEVELAND, AND HERMANN B. MacALPINE, OF LAKEWOOD, OHIO, ASSIGNORS TO THE RIBBON LIFE COMPANY, OF CLEVELAND, OHIO, A CORPORATION OF OHIO.

MOISTENING ATTACHMENT FOR TYPE-WRITER RIBBONS.

1,276,263.        Specification of Letters Patent.     Patented Aug. 20, 1918.

Application filed October 22, 1917. Serial No. 197,847.

*To all whom it may concern:*

Be it known that we, JOHN C. PHELAN and HERMANN B. MACALPINE, citizens of the United States, residing at East Cleveland and Lakewood, respectively, in the county of Cuyahoga and State of Ohio, have invented certain new and useful Improvements in Moistening Attachments for Type-Writer Ribbons, of which the following is a specification.

This invention relates to moistening attachments for typewriter ribbons, and is an improvement on or modification of the device for the same purpose shown in our pending application for U. S. Patent, Serial No. 180,487 filed July 13, 1917.

The object of the present invention is the same as that stated in the former case, that is, to moisten and revive a typewriter or other ribbon while it is being used, the present invention having various advantages or differences of construction.

In the accompanying drawings:

Figure 1 is a top plan view showing the mode of applying the device to a typewriter.

Fig. 2 is a front elevation of the device.

Fig. 3 is a rear elevation.

Fig. 4 is a horizontal section.

Fig. 5 is a similar section with the wick removed and the device out of action.

Fig. 6 is a section on the line 6—6 of Fig. 4.

Fig. 7 is a detail top plan with the cover removed.

Fig. 8 is a perspective of the cage.

In the drawings, 1 indicates a circular casing forming a large circular chamber 2 which is connected at one side by a passage 4 to the chamber of a small circular casing 3. The passage 4 is enlarged as indicated at 5, for the purpose to be explained. A pivot 6 having a pointed end 7 stands in the center of the chamber 3, and mounted on this stud or pivot is a corrugated roller 7ª over or around which fits a member 8 which we will designate as a cage or shield. This member 8 comprises an upper ring 9 and a lower ring 10 connected by a segmental wall or standing part 11 the length of which is one-fourth the circumference of the rings. The ring 9 has diametrical cross pieces 12 therein which rest on top of the roller 7ª when the cage is fitted thereover.

The side wall of the chamber 3 is provided with vertical slots 13 and 14 through which the ribbon 15 passes, in and out, the part of the ribbon within the casing being thus in contact with the roller 7ª when the cage 8 is in a certain position, as shown in Fig. 4. One of the ribbon spools is indicated at 16.

A wick 17 is coiled in the chamber 2 and extends through the neck 4 where it is somewhat compressed, and thence into the chamber 5 where it again expands to its normal thickness. The wick is saturated by the moistening fluid placed in the chamber 2, and the fluid is conducted slowly through the compressed part 18 in the neck 4 into the end 19 in the chamber 5, where the wick is in contact with the corrugated roller 7ª. As the ribbon is drawn through the casing the wick wets the roller and the moisture is applied to the ribbon, the roller rotating in consequence of the friction of the ribbon therewith.

When all the ribbon is wound on the spool 16 it is customary to wind the same back to the other spool (not shown) on many machines, and when this is being done it is not desired to moisten the ribbon. By lifting a catch 21, which is mounted on the top 22 of the casing 3, and which works in a slot 24 in said casing and engages a lug 23 on the cage 8, said lug is disengaged, and the cage is free to turn with the roller, and when this action is permitted the cage will turn with the roller to the position shown in Fig. 5, at which time the wall 8 will pass between the roller 7ª and the ribbon, thereby spacing the ribbon out of contact with roller, and the ribbon will then be drawn through without wetting the same. When the ribbon is again drawn the other way the friction will turn the sleeve back to original position allowing the ribbon to contact with the roller and receive the liquid from it by the lug 23 again stopping against the catch 21 as shown in Fig. 3.

The top 22 of the casing 3 is cut away as indicated at 25, and the corners rounded as shown at 26, so that the ribbon can be threaded or slipped into the slots 13 and 14 without removing the cover 22.

The device is mounted on the front plate of the typewriter by sleeves 27 projecting from the casings, which slip over studs 28 formed to receive them.

We claim:

1. A ribbon moistening attachment, comprising a casing, a roller therein over which the ribbon travels, means to supply liquid to the surface of the roller, and means to hold the ribbon out of contact with the roller when desired comprising a shield movable into and out of position between the ribbon and the roller.

2. A ribbon moistening attachment, comprising a casing having a ribbon passage through the same, a roller in the casing in contact with the ribbon, and means to supply liquid to the surface of the roller, and a turning shield extending partly around the roller and adapted to space the ribbon therefrom when desired.

3. A ribbon moistening attachment, comprising a casing having a ribbon passage through the same, a roller in the casing in contact with the ribbon, and means to supply liquid to the surface of the roller, and a segmental turning shield around the roller automatically actuated thereby to space the ribbon therefrom when the roller is rotated one way and allow the ribbon to contact with the roller when the latter is rotated the opposite way.

4. A ribbon moistening attachment, comprising a wick casing, a roller casing, a contracted neck connecting the casings, a wick in the wick casing and extending through the neck in compressed condition, a roller in the roller casing, in contact with the end of the wick, the latter casing having a passage through the same for the ribbon to contact with the roller.

In testimony whereof, we do affix our signatures in presence of two witnesses.

JNO. C. PHELAN.
HERMANN B. MacALPINE.

Witnesses:
G. C. NEWELL,
LEON LEVY.